(No Model.) 2 Sheets—Sheet 1.
E. T. GREENFIELD.
ELECTRICAL FIXTURE.
No. 459,704. Patented Sept. 15, 1891.
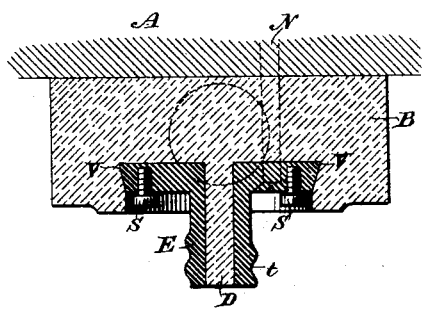
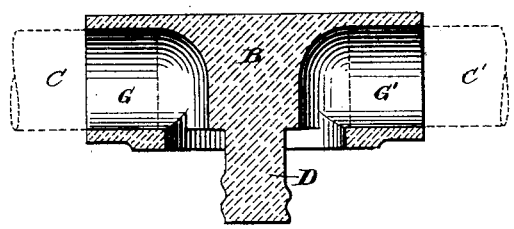
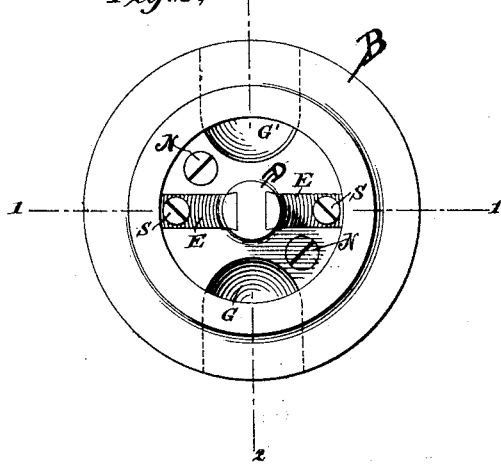
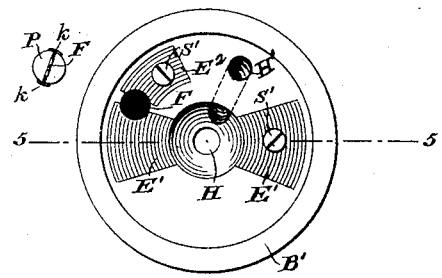
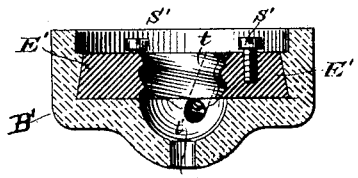
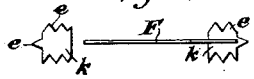
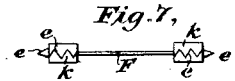
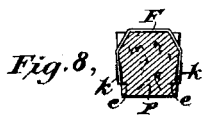
Witnesses
Geo. W. Breck
Edward Thorpe
Inventor
Edwin T. Greenfield
By his Attorney
Charles J. Kintner (No Model.) 2 Sheets—Sheet 2.
E. T. GREENFIELD.
ELECTRICAL FIXTURE.

No. 459,704. Patented Sept. 15, 1891.

Witnesses
Geo. W. Breck
Edward Thorpe

Inventor
Edwin T. Greenfield
By his Attorney
Charles J. Kintner

UNITED STATES PATENT OFFICE.

EDWIN T. GREENFIELD, OF NEW YORK, N. Y., ASSIGNOR TO THE INTERIOR CONDUIT AND INSULATION COMPANY, OF SAME PLACE.

ELECTRICAL FIXTURE.

SPECIFICATION forming part of Letters Patent No. 459,704, dated September 15, 1891.

Application filed December 31, 1890. Serial No. 376,326. (No model.)

*To all whom it may concern:*

Be it known that I, EDWIN T. GREENFIELD, a citizen of the United States, residing at New York, county of New York, and State of New York, have made a new and useful Improvement in Electrical Fixtures, applicable generally in the art where it is desired to make electrical connections with branch circuits to translating devices, such as electric lights, electric motors, and kindred apparatus, of which the following is a specification.

My invention is directed particularly to improvements in switch or ceiling blocks which are used in the art for connecting electric lights and kindred translating devices to branch mains running into buildings and similar places; and it has for its objects, first, the simplification and cheapening of this type of devices; second, the rendering of the same more permanent or secure in their connections, thereby insuring more perfect conductivity of the current; third, the making of the same in as few pieces as possible, which shall be permanently secured together and prepared for the trade as an article of manufacture; fourth, the preparation of a cheap, simple, and efficient fusible cut-out, which shall constitute a part of the fixture, and which is adapted to be easily put in position and removed without the aid of screws and other superfluous parts. I accomplish these several objects by the construction and use of the devices hereinafter described, but particularly pointed out in the claims, which follow this specification.

My invention will be fully understood by referring to the accompanying drawings, in which—

Figure 10:
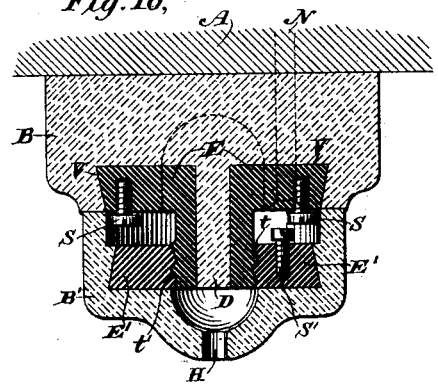
Figure 11:
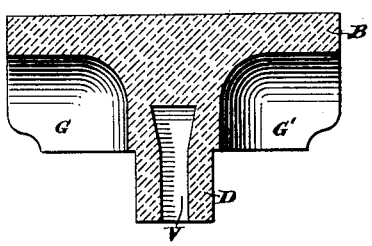
Figure 12:
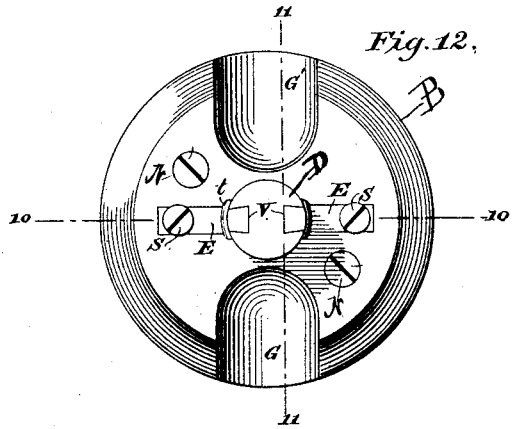
Figure 13:
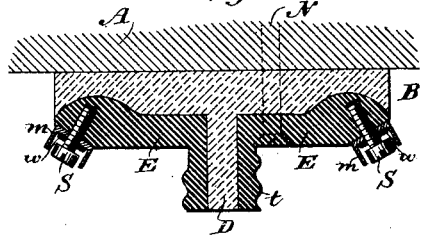
Figure 15:
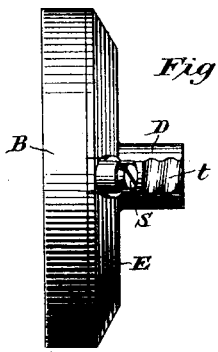
Figure 14:
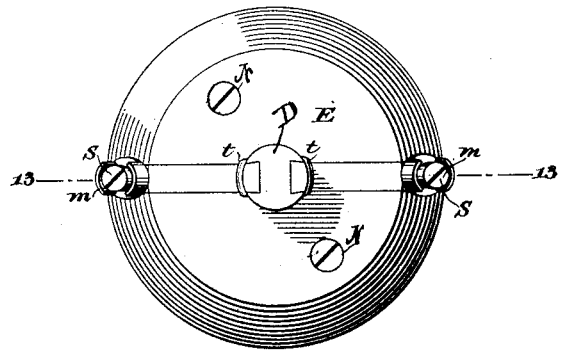

Figure 1 represents a sectional view of one portion of my ceiling-block as attached to the ceiling, said section being taken on line 1 1, Fig. 2. Fig. 2 is a plan view thereof. Fig. 3 is a sectional view on line 2 2, Fig. 2, showing the application of the block or attachment in connection with tubes or conduits designed for use where it is desired to take off branch circuits from conductors located in such tubes or conduits. Fig. 4 is a plan view of the lower or removable portion of the ceiling-block. Fig. 5 is a sectional view of the same, taken on line 5 5, Fig. 4. Fig. 6 is a detail view showing the manner in which I prepare my improved fusible cut-out. Fig. 7 is a plan view of the cut-out as finally prepared. Fig. 8 is an enlarged sectional view of my improved plug with cut-out attached. Fig. 9 is an enlarged perspective view of the completed cut-out plug. Fig. 10 is a sectional view of the ceiling-block complete, taken on line 10 10, Fig. 12. Fig. 11 is a vertical sectional view on line 11 11, Fig. 12, of the upper portion of the block, showing the manner of making the same. Fig. 12 a plan view as seen looking at Fig. 10 from below, with the lower block B' removed. Fig. 13 is a sectional view of the upper portion of the block, taken on line 13 13, Fig. 14, showing my improved binding-screw attachments. Fig. 14 is a view of the upper portion of the block, as seen in looking at Fig. 13 from the under side. Fig. 15 is a side elevational view as seen looking at Fig. 14 from left to right.

Referring now to the drawings in detail, A represents the ceiling to which the block is attached by one or more screws N.

B constitutes the base or supporting portion of the block, made preferably of porcelain, vegetable fiber, or some equivalent non-combustible non-conducting material. This base is cast with an indenture or hollow portion and a projecting portion D, and is provided with dovetailed grooves V on opposite sides of the projection D and similar dovetailed grooves in the base, as clearly shown in Figs. 1, 10, 11, and 12, said grooves being adapted to receive the cast-metal conducting parts E, screw-threaded on their lower ends at *t*. These cast-metal conducting parts are made preferably of lead, but may be of any material which will readily set in position in the base-blocks B when placed in the mold for casting.

B' represents the removable portion of the block, and is provided with a pair of conducting parts E' similar to the parts E, and cast in position in dovetailed grooves in the same manner as are the parts E. These two sets of conducting parts are arranged, as will be readily understood, on opposite sides of their respective base-blocks, and are of such width as to inclose each less than one-quarter of the entire circumference, so that when the two blocks are screwed together by means of the screw-threads $t$ and $t'$ there will be no danger of a short circuit between the conducting parts E E and E' E'. In other words, the insulated space around the entire circumference of the two screw-threaded portions is greater on each portion of the block than the conducting portions embraced in the parts E E and E' E'. The upper portion of the block is provided with binding-screws $s$ $s$ for branch conductors, and the lower portion is provided with similar binding-screws $s'$ $s'$ for the conductors running to the lamp (not shown) through the apertures H and H'. One of the binding-screws $s'$ is attached to one of the fixed embedded conducting parts E', and the other of said binding-screws $s'$ is attached to an independent fixed part $E^2$, also embedded in the block B' at a sufficient distance from one of the conducting parts E' to admit of the insertion of the plug P in the opening between the ends of said conducting parts, as shown in Fig. 4.

In Fig. 3 I have shown the upper portion of the block as applicable to a system of conduit-tubes, where the conductors are carried through pipes or conduits C C' and enter the block through the openings G G'.

In Fig. 10 the entire ceiling-block is shown in position, the current entering through the left-hand binding-screw $s$, passing thence by the metal plate E through the screw-thread $t$ to the lower corresponding metal plate E', thence outward through the conductor, passing to the lamp suspended by the usual insulated conductor through the aperture H, (said lamp and conductor not being shown,) the return circuit passing back by way of the plate E', screw-thread $t$, conducting-plate E, and binding-screw $s$, out to the main.

In Figs. 13, 14, and 15 I have shown my improved form of binding-screw, which consists of a simple screw threaded into the metallic base and provided with a protecting shield or sleeve $m$, adapted to surround the conductor $w$ when it is looped in place, and to insure good contact without any liability of the loop becoming detached by side movement. This sleeve is slitted at its opposite sides, as clearly shown in Fig. 14, and affords a simple and efficient means of securing the conductors.

Fig. 6 illustrates the manner in which I prepare my improved form of fusible cut-out. I take a piece of fusible wire F and prepare two metallic end plates $k$, of conducting material, having serrated edges $e$. These serrated edges are then folded over the ends of the fusible wire F and firmly secured thereto by a pair of pliers or with a hammer, the end serrations $e$ being left extended, as shown in Fig. 7. After having prepared a number of these I more firmly secure the end pieces $k$ to the fusible wire F by subjecting these parts to an electroplating bath. After a sufficient deposit of the desired metal has been effected in this manner I prepare a plug P of yielding material, such as cork, and slit its opposite edges, as clearly shown in Figs. 8 and 9, after which I place the fusible wire F in the position shown in Fig. 8, and carefully secure the plates $k$ to the sides of the cork or plug by forcing the serrations or points $e$ into the position shown. By this arrangement I devise a plug which is cheap, simple, and efficient, and may be placed in position, as shown in Fig. 4, with the metallic plates $k$ in contact with the conducting portions E'. This plug P is driven firmly home, and when the fusible wire F is ruptured by an abnormal current a new fuse may be quickly put in position without the aid of screws or other superfluous appliances.

The entire operation of the apparatus will be readily understood by those skilled in the art without further description.

Having thus described my invention, what I claim, and desire to secure by Letters Patent of the United States, is—

1. As a new article of manufacture, a ceiling-block made of insulating material, having the conducting parts cast into non-conducting parts, substantially as described.

2. A ceiling or switch block made in two parts, each having a pair of conducting parts cast into non-conducting supports and provided with means for electrically uniting the conducting parts, substantially as described.

3. A ceiling-block consisting of a base-block adapted to be fixedly secured to the ceiling or elsewhere, and a detachable block, in combination with two pairs of conducting parts, one for each block, said conducting parts being cast into the body of the blocks, substantially as described.

4. A two-part ceiling-block having two sets of conducting parts, one for each block, said conducting parts being cast into non-conducting bases or supports, substantially as described.

5. A ceiling-block made of non-conducting material, provided with a depression and a depending neck or portion, as D, in combination with a pair of conducting parts embedded in said depression and depending neck, and a detachable female portion provided with corresponding conducting parts similarly embedded, substantially as described.

6. A ceiling-block made of two parts of insulating material, having each a pair of conducting parts cast therein, said parts being screw-threaded together, substantially as described.

7. A ceiling-block made up of two pieces of non-conducting material, each having a pair of conducting parts cast in position, one piece and its conducting part having a male screw-threaded extension and the other a corresponding female depression, substantially as described.

8. A ceiling-block consisting of a fixed and a removable part, each made of insulating material, in combination with conducting parts embedded in dovetailed grooves in said insulating material, substantially as described.

9. A cut-out consisting of a fusible conductor provided with enlarged ends made of conducting material folded over the ends of the fusible part and electroplated thereto and embedded in a slitted cork, substantially as described.

10. A cut-out consisting of a fusible part F, having enlarged ends $k$ folded over the ends of the fusible part and provided with projections $e\ e$, said cut-out being embedded in a slitted cork or plug, substantially as described.

EDWIN T. GREENFIELD.

Witnesses:
A. V. HINEY,
C. J. KINTNER.